US012316472B2

(12) United States Patent
Miller et al.

(10) Patent No.: US 12,316,472 B2
(45) Date of Patent: *May 27, 2025

(54) HOSPITALITY PROPERTY MANAGEMENT TOOL AND SYSTEM AND METHOD FOR USE OF SAME

(71) Applicant: Enseo, LLC, Plano, TX (US)

(72) Inventors: Thomas R. Miller, Plano, TX (US);
Vanessa Ogle, Fairview, TX (US);
William C. Fang, Plano, TX (US)

(73) Assignee: Enseo, LLP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,852

(22) Filed: Dec. 20, 2023

(65) Prior Publication Data

US 2024/0146571 A1 May 2, 2024

Related U.S. Application Data

(63) Continuation of application No. 17/746,603, filed on May 17, 2022, now Pat. No. 11,855,798, which is a continuation of application No. 16/881,968, filed on May 22, 2020, now Pat. No. 11,336,478, which is a
(Continued)

(51) Int. Cl.
| | |
|---|---|
| *H04L 12/28* | (2006.01) |
| *H04N 7/10* | (2006.01) |
| *H04N 7/173* | (2011.01) |
| *H04N 21/214* | (2011.01) |
| *H04N 21/41* | (2011.01) |

(Continued)

(52) U.S. Cl.
CPC ........ *H04L 12/282* (2013.01); *H04L 12/2814* (2013.01); *H04L 12/2829* (2013.01); *H04L 12/2832* (2013.01); *H04N 7/106* (2013.01); *H04N 7/17354* (2013.01); *H04N 21/2143* (2013.01); *H04N 21/4131* (2013.01); *H04N 21/43615* (2013.01); *H04N 21/4622* (2013.01)

(58) Field of Classification Search
CPC ............... H04L 12/282; H04L 12/2814; H04L 12/2829; H04L 12/2832; H04N 7/106; H04N 7/17354; H04N 21/2143; H04N 21/4131; H04N 21/43615; H04N 21/4622
See application file for complete search history.

(56) References Cited

U.S. PATENT DOCUMENTS

| | | | |
|---|---|---|---|
| 5,661,517 A | 8/1997 | Budow et al. | |
| 5,664,174 A | 9/1997 | Agrawal et al. | |
| 5,675,788 A | 10/1997 | Husick et al. | |

(Continued)

*Primary Examiner* — Ramesh B Patel
(74) *Attorney, Agent, or Firm* — Scott Griggs; Griggs Bergen LLP

(57) ABSTRACT

A hospitality property management tool and system and method for use of the same are disclosed. In one embodiment of the system, set-top boxes are located in respective rooms at a hospitality establishment. The set-top boxes are joined in network communication with environmental amenities, such as lights and a thermostat that respectively control lighting and temperature. The set-top boxes utilize an unoccupied room profile and occupied room profile to set the environmental conditions, such as lighting and temperature, in the rooms. A guest preference profile may be activated within a room to provide guest-specific environmental conditions in the room associated with the guest.

20 Claims, 10 Drawing Sheets

Related U.S. Application Data continuation of application No. 16/126,607, filed on Sep. 10, 2018, now Pat. No. 10,666,452.

(60) Provisional application No. 62/555,672, filed on Sep. 8, 2017.

(51) Int. Cl.
*H04N 21/436* (2011.01)
*H04N 21/462* (2011.01)

(56) References Cited

U.S. PATENT DOCUMENTS

| | | | |
|---|---|---|---|
| 5,742,816 A | 4/1998 | Barr et al. | |
| 5,842,200 A | 11/1998 | Agrawal et al. | |
| 6,029,176 A | 2/2000 | Cannon | |
| 6,286,005 B1 | 9/2001 | Cannon | |
| 6,854,010 B1 * | 2/2005 | Christian | H04L 63/0272 709/219 |
| 7,328,166 B1 * | 2/2008 | Geoghegan | G06Q 10/02 705/5 |
| 8,112,295 B1 * | 2/2012 | Parker | G06Q 30/02 705/5 |
| 8,249,731 B2 * | 8/2012 | Tran | G16H 40/67 236/49.2 |
| 9,088,828 B2 * | 7/2015 | Ogle | H04N 21/25 |
| 9,326,009 B2 | 4/2016 | Ogle et al. | |
| 9,560,388 B2 | 1/2017 | Ogle et al. | |
| 9,710,987 B2 * | 7/2017 | Scoggins | G07C 9/28 |
| 9,832,489 B2 | 11/2017 | Ogle et al. | |
| 10,405,008 B2 * | 9/2019 | Fang | H04N 21/8126 |
| 10,666,452 B2 * | 5/2020 | Miller | H04L 12/282 |
| 10,687,184 B2 * | 6/2020 | Silverstein | G01S 7/006 |
| 11,336,478 B2 * | 5/2022 | Miller | H04L 12/282 |
| 11,366,188 B2 * | 6/2022 | Poole | G01R 33/3806 |
| 11,827,077 B2 * | 11/2023 | Bryant | B60H 1/3202 |
| 11,855,798 B2 * | 12/2023 | Miller | H04L 12/2832 |
| 2005/0144642 A1 * | 6/2005 | Ratterman | H04N 21/4882 348/E7.071 |
| 2007/0050197 A1 * | 3/2007 | Efron | G06Q 10/02 705/26.1 |
| 2009/0313053 A1 * | 12/2009 | Gengarella | G06Q 10/02 705/5 |
| 2010/0250707 A1 * | 9/2010 | Dalley | G06Q 30/0202 709/219 |
| 2013/0328909 A1 | 12/2013 | Pacheco et al. | |
| 2017/0142449 A1 | 5/2017 | Ogle et al. | |
| 2018/0084285 A1 | 3/2018 | Ogle et al. | |
| 2018/0249188 A1 | 8/2018 | Fang et al. | |
| 2018/0270510 A1 | 9/2018 | Fang et al. | |
| 2019/0081811 A1 * | 3/2019 | Miller | H04L 12/2814 |
| 2022/0278866 A1 * | 9/2022 | Miller | H04L 12/2832 |

\* cited by examiner

HOSPITALITY PROPERTY MANAGEMENT TOOL AND SYSTEM AND METHOD FOR USE OF SAME

PRIORITY STATEMENT & CROSS-REFERENCE TO RELATED APPLICATIONS

This application is a continuation of U.S. patent application Ser. No. 17/746,603, entitled "Hospitality Property Management Tool and System and Method for Use of Same," filed on May 17, 2022, in the names of Thomas R. Miller et al., now U.S. Pat. No. 11,855,798 issued on Dec. 26, 2023; which is a continuation of U.S. patent application Ser. No. 16/881,968, entitled "Hospitality Property Management Tool and System and Method for Use of Same," filed on May 22, 2020, in the names of Thomas R. Miller et al., now U.S. Pat. No. 11,336,478, issued on May 17, 2022; which is a continuation of U.S. patent application Ser. No. 16/126,607, entitled "Hospitality Property Management Tool and System and Method for Use of Same," filed on Sep. 10, 2018, in the names of Thomas R. Miller et al., now U.S. Pat. No. 10,666,452, issued on May 26, 2020; which claims priority from U.S. Patent Application No. 62/555,672, entitled "Hospitality Property Management Tool and System and Method for Use of Same," filed on Sep. 8, 2017, in the names of Vanessa Ogle et al.; all of which are hereby incorporated by reference, in entirety, for all purposes.

TECHNICAL FIELD OF THE INVENTION

This invention relates, in general, to the management of hospitality real estate and, in particular, to property management tools and systems and methods for use of the same for the operation, control, and oversight of hospitality properties, such as lodging establishments, motels, or hotels, for example.

BACKGROUND OF THE INVENTION

Without limiting the scope of the present invention, the background will be described in relation to property management in the hospitality industry, as an example. Property management in the hospitality industry requires a need for the asset to be cared for, monitored and accountability given for its useful life and condition. As property portfolios grow in the hospitality industry, the processes, systems and human resources required to manage the lifecycle of all acquired property increases in complexity. As a result of limitations in existing technology, there is a need for improved systems and methods of providing understanding and visibility into the management of hospitality environments.

SUMMARY OF THE INVENTION

It would be advantageous to achieve understanding and visibility into the management of hospitality environments. It would also be desirable to enable a computer-based solution that would enable property management tools to improve the operation, control, and oversight of hospitality properties, such as lodging establishments, motels, or hotels. To better address one or more of these concerns, property management tools and systems and methods for use of the same, are disclosed that are applicable to the hospitality industry. In one embodiment of the system, set-top boxes are located in respective rooms at a hospitality establishment. The set-top boxes are joined in network communication with environmental amenities, such as lights and a thermostat that respectively control lighting and temperature. The set-top boxes utilize an unoccupied room profile and occupied room profile to set the environmental conditions, such as lighting and temperature, in the rooms. A guest preference profile may be activated within a room to provide guest-specific environmental conditions in the room associated with the guest. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
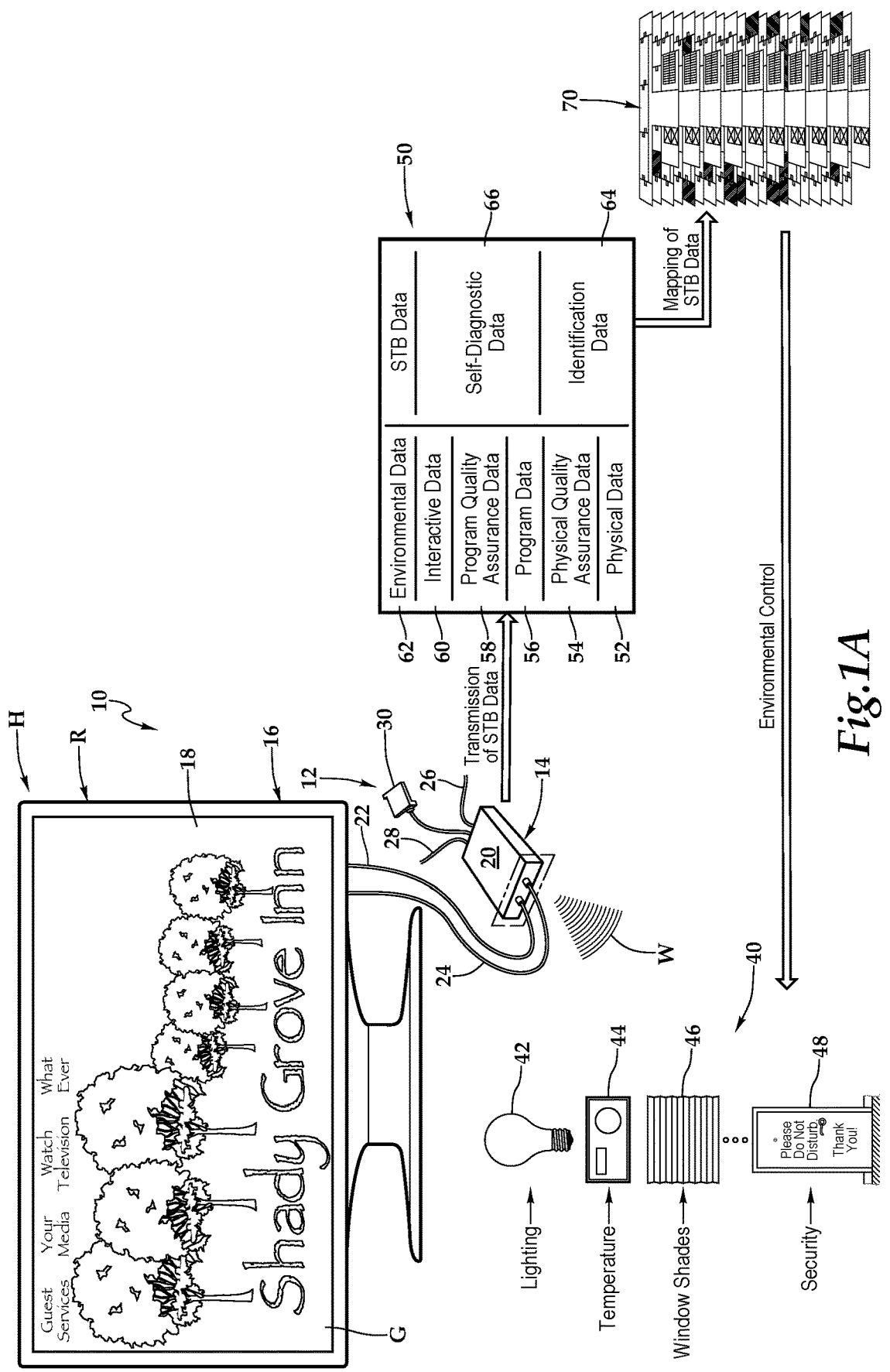
FIG. 1A is a schematic diagram depicting one embodiment of a system for providing hospitality property management according to the teachings presented herein.

Referring initially to FIG. 1A, therein is depicted one embodiment of a system 10 for the management of a hospitality lodging establishment. The hospitality lodging establishment, which may be referred to as a hospitality property, may be a furnished multi-family residence, dormitory, lodging establishment, hotel, hospital, or other multi-unit environment. As shown, by way of example and not by way of limitation, the hospitality environment is depicted as a hospitality establishment H having various rooms, including room R and spaces. As illustrated, the hospitality establishment H is a hotel. An entertainment center 12 includes a set-top box 14, which is communicatively disposed with various amenities associated with the hospitality environment, including a display 16. As shown, the display 16 is depicted as a television having a screen 18, which is showing a guest welcoming portal G. It should be appreciated however, that the display 16 may also be any electronic visual display device, for example. Entertainment centers, like the entertainment center 12, may be deployed throughout the rooms R and spaces S of the hospitality establishment H. The entertainment center 12 is depicted as including the set-top box 14 and the display 16. It should be appreciated however that the entertainment center 12 may include any combination of electronic appliances, components, and devices and, in particular, any combination of electronic appliances, components, and devices found in the hospitality environment.

Figure 1B:
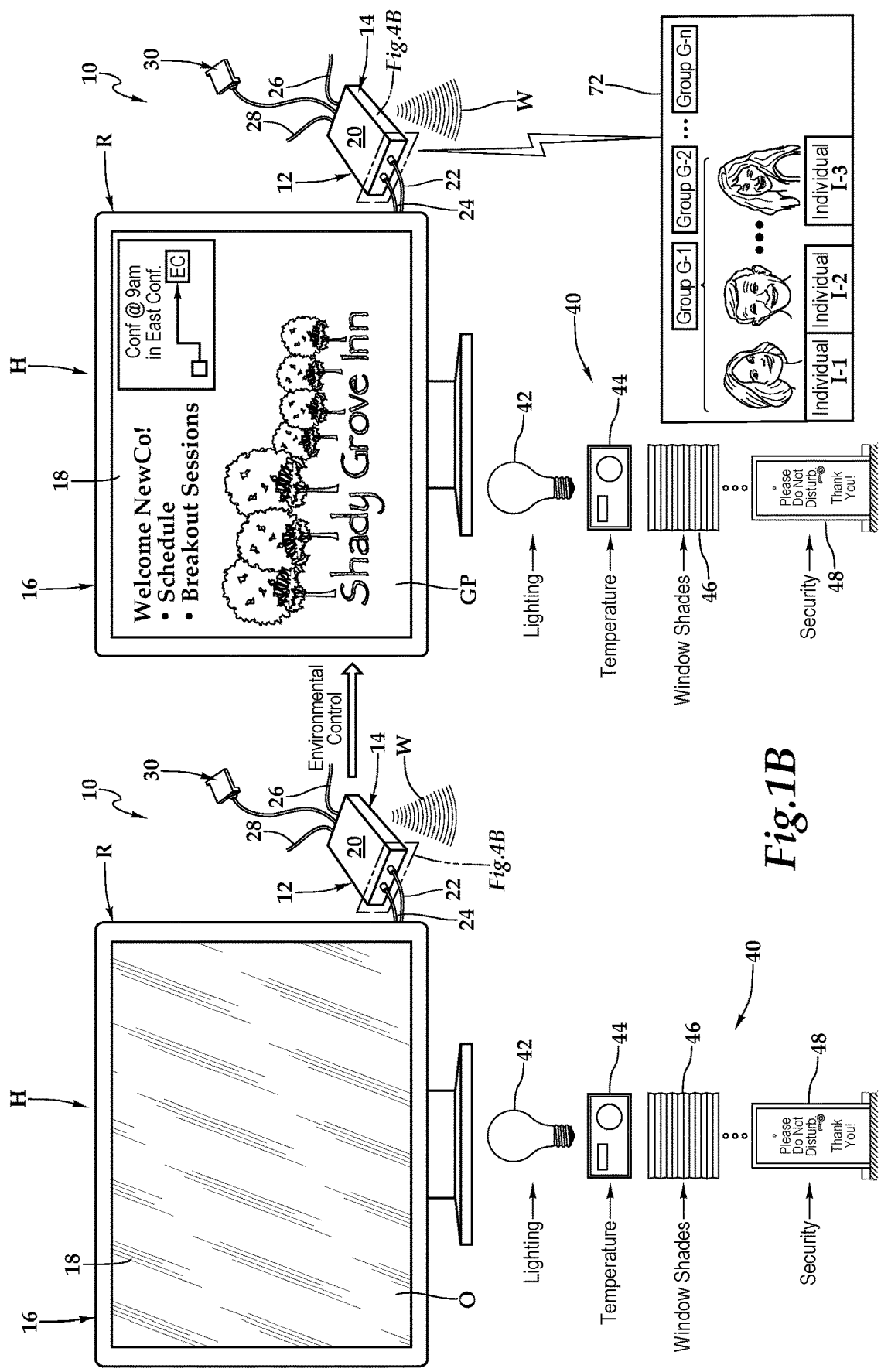
FIG. 1B is also a schematic diagram depicting one embodiment of the system for providing hospitality property management presented in FIG. 1A.

As shown, with respect to the set-top box 14 having a housing 20, and the display 16, a connection, which is depicted as an HDMI connection 22, connects the set-top box 14 to the display 16. Other connections include a power cable 24 coupling the set-top box 14 to a power source, a coaxial cable 26 coupling the set-top box 14 to an external cable source, and a data connection depicted as a category five (Cat 5) cable 28 coupling the set-top box 14 to an external pay-per-view source at a hotel or other lodging establishment, for example. As shown, the set-top box 14 may include a dongle 30 providing particular technology and functionality extensions thereto. That is, the set-top box 14 may be a set-top box-dongle combination in one embodiment. More generally, it should be appreciated that the cabling connected to the set-top box 14 will depend on the environment and application, and the cabling connections presented in FIG. 1 are depicted for illustrative purposes. Further, it should be appreciated that the positioning of the set-top box 14 will vary depending on environment and application and, with certain functionality, the set-top box 14 may be placed more discretely behind the display 16. Moreover, it should be appreciated that the set-top box 14 and the display 16 may be at least partially or fully integrated. The set-top box 14 communicates wirelessly, as indicated by wireless signaling W, with various amenities 40, which are depicted as environmental amenities, within an environment of the room R. As shown, the amenities may include lighting 42, a thermostat 44 representing temperature control, window shades 46, and security 48, which is depicted as a door indication for "Please Do Not Disturb."

The set-top box 14 collects various set-top box data 50 including physical data 52, physical quality assurance data 54, program data 56, program quality assurance data 58, interactive data 60, and environmental data 62. Additionally, the set-top box data 50 includes identification data 64 identifying the set-top box 14 as well as self-diagnostic data 66. In one embodiment, the physical data 52 includes the actual hardware specifications and arrangement of cable connections at the time of installation. The physical quality assurance data 54 may be physical state data relating to a current condition of the hardware and cable connections. The program data 56 may include information about the system software that engages the set-top boxes' hardware and information about the application software that provides functionality relating to a guest's or hotel's interest, for example. The program quality assurance data 58 may be software state data relating to the current operations of the system software and the application software. In one embodiment, the interactive data 60 includes information about the display-based interactions of a guest with the set-top box. The environmental data 62 includes information about the non-display-based interactions of a guest with the set-top box. In one implementation, the identification data 64 may include the location of the set-top box 14 as well as other information derived from the physical data 52 and the program data 56, which identifies the set-top box. The self-diagnostic data 66 relates to an application running automatically at a regular interval or continuously, for example, that detects faults—typically before becoming serious—in the physical data 52, the physical quality assurance data 54, the program data 56, the program quality assurance data 58, the interactive data 60, or the environmental data 62, for example.

By way of example, and not by way of limitation, the physical data 52 may be processor specifications, memory specifications, storage specifications, wireless specifications, firmware versions, connection to display by type, connection to display by model number, network addressing, MAC addresses, or the like. The physical quality assurance data 54 may be online/offline status, power state, display control status, display connection status, HDMI interface status, control interface status, memory usage, unit up-time, hardware installation progress, or the like. The program data 56 may be user interface software version, operating system version, settings version, welcome menu version, and software configuration, or the like. The program quality assurance data 58 may be program guide status, debug console log, software usage, and software installation progress, or the like. The interactive data 60 may be guest configuration data, television channel viewing, program viewing, Internet history, program guide interaction, or the like. The environmental data 62 may be amenity interaction, lighting status, thermostat status, window shades status, door status, or the like. The identification data 64 may be the serial number and addressing information gathered from the physical data 50, software identification information gathered from the program data, room number assigned to the set-top box, or the like. The self-diagnostic data 66 may be percent online, display output errors, High Bandwidth Digital Content Protection (HBDCP) errors, self-test results, set-top box health reports, or the like.

As will be discussed in further detail hereinbelow, a map view 70 of the hospitality establishment H, including room R, may be rendered by the system 10 as part of and following the collection of the set-top box data 50. The map view 70 may be utilized in association with establishing the environmental conditions within the hospitality establishment. More particularly, in one operational embodiment of the system, as discussed, the set-top box 14 stores various types of set-top box data 50 and transmits the set-top box data 50. The system 10 receives and stores the set-top box data 50. The system 10 may render the map view 70 of the hospitality establishment based on obtained map data, as will be discussed in more detail hereinbelow. The map view 70 may include a graphical representation of the room and other rooms at the hospitality establishment. The system 10 may annotate the graphical representation of the room with at least a portion of the set-top box data 50.

In one implementation, the set environmental conditions across multiple properties may be monitored and controlled through the map view 70. More particularly, with reference to FIG. 1B, the set-top box 14 utilizes an unoccupied room profile and occupied room profile to set the environmental conditions, such as lighting and temperature, in the rooms. The set-top box 14 is joined in network communication with the amenities 40, which are environmental amenities that may control the lighting 42, the temperature 44, the window shades 46, and the security 48. The set-top box 14 uses the joined network communication with the amenities 40 to send environmental control information to the amenities 40 consistent with the environmental profile, such as the unoccupied room profile. As shown, the room R is unoccupied and an unoccupied room profile sets the environmental conditions until the room is occupied, at which time a guest preference profile 72 sets the environmental conditions. The guest preference profile 72 may be activated within the room R to provide guest-specific environmental conditions in the room R associated with the guest. The guest preference profile 72 has information about the guest preferences for one or more of the environmental conditions. The set-top box 14 uses the joined network communication with the amenities 40 to send environmental control information to the amenities 40 consistent with the environmental profile, such as the guest preference profile 72. It should be appreciated that the guest preference profile 72 may be populated with some data of the occupied room profile if the guest has not expressed a preference.

With respect to the guest preference profile 72, the guest individual $I_1$ is part of Group G-1, as opposed to Groups G-2 though G-n. As shown, Group G-1 includes multiple individuals such as individual $I_1$ and individual $I_2$ through individual $I_n$. These individuals, individual $I_1$ and individual $I_2$ through individual $I_n$, have a common hospitality aspect such as group travel relative to the hospitality establishment, group meeting accommodations relative to the hospitality establishment, or group event accommodations relative to the hospitality establishment, for example. Based on the common hospitality aspect, custom content is provided to the display 16 from the set-top box 14. In the instant example in FIG. 1B, the individuals, including individual $I_1$, of Group G-1 are all part of a group called NewCo and are attending a conference and have a specific schedule with breakout sessions. The events are occurring in the east conference room at 9 am as shown in the custom guest preference content GP. As previously mentioned, with respect to the custom guest preference content GP, the guest preference profile 72 is located within the set-top box 14 or, alternatively, the guest preference profile 72 is accessible by the set-top box 14 at a server (e.g., a server 90 in FIGS. 3A and 3B). Further, individuals may be associated with particular groups at the time of room reservation, event reservation, room check-in or event check-in, for example with an individual's proximate wireless-enabled interactive programmable device being associated with the individual at the same time, for example.

Figure 2:
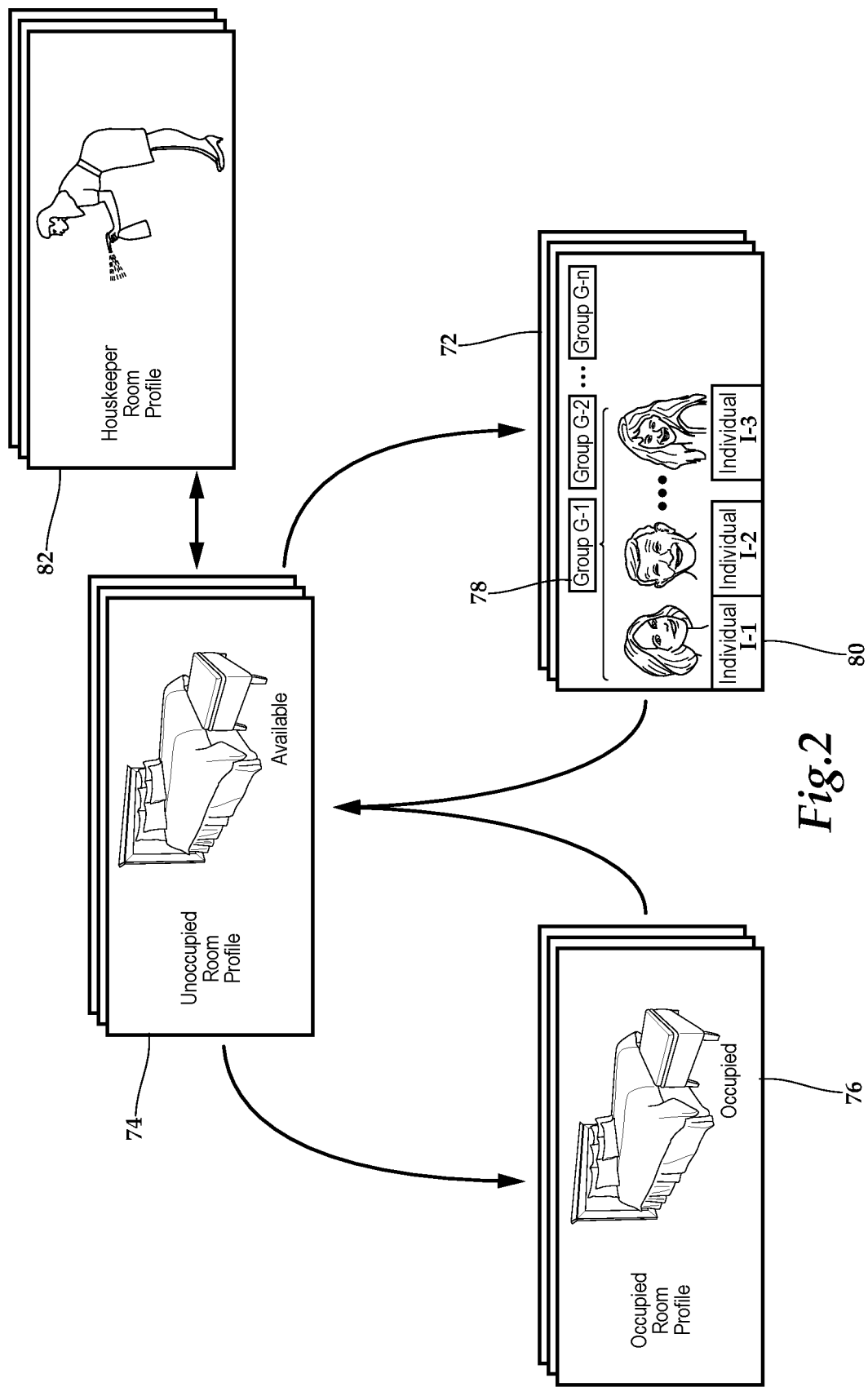
FIG. 2 is a schematic diagram depicting one embodiment of various profiles utilized in the system presented in FIG. 1A and FIG. 1B.

Referring now to FIG. 2, the set-top box 14 utilizes environmental profiles to set environmental conditions, including lighting 42, thermostat 44, window shades 46, security 48, and power outlet function, for example. As shown, the set-top box 14 utilizes an unoccupied room profile 74 and an occupied room profile 76 to set the environmental conditions in the rooms across a property and even across multiple properties. The guest preference profile 72 may be activated within a room to provide guest-specific environmental conditions in the room associated with the guest. The guest preference profile 72 may include an individual sub-profile 80, a group sub-profile 78, and selection rules. The individual sub-profile 78 provides the environmental conditions and the group sub-profile providing the environmental conditions 80. The selection rules select between the application of the individual sub-profile 78 and the group sub-profile 80. The group sub-profile relates to a hospitality aspect such as group travel relative to the hospitality establishment H, group meeting accommodations relative to the hospitality establishment H, group event accommodations relative to the hospitality establishment H, and the like.

As depicted, the unoccupied room profile 74 is utilized by a set-top box 14 to set the environmental conditions in the room R when the room R is unoccupied and available. The occupied room profile 76 is utilized by a set-top box 14 to set the environmental conditions in the room R when the room R is occupied and unavailable. In one embodiment, alternatively, if the guest preference profile 72 is available, then the guest preference profile 72 is utilized instead of the occupied room profile 76. In one embodiment, the guest preference profile 72 is actuated in the room R occupied by the guest corresponding to the guest preference profile 72 and the particular guest preference profile 72 is actuated in only room of the hospitality establishment H whereas the unoccupied room profile 74 and the occupied room profile 76 may be utilized across the entire hospitality establishment H in multiple rooms.

As shown, a housekeeping/maintenance profile 82 may also be utilized. The housekeeping/maintenance profile 82 provides environmental conditions when a housekeeper or maintenance professional are within the room, for example. The housekeeping/maintenance profile 82 may be utilized to temporarily override the unoccupied room profile 74 with the housekeeping/maintenance profile. Further, the housekeeping/maintenance profile 82 may be utilized to temporarily override the occupied room profile 76 or the guest preference profile 72 when a housekeeper or maintenance professional is within the room.

Figure 3A:
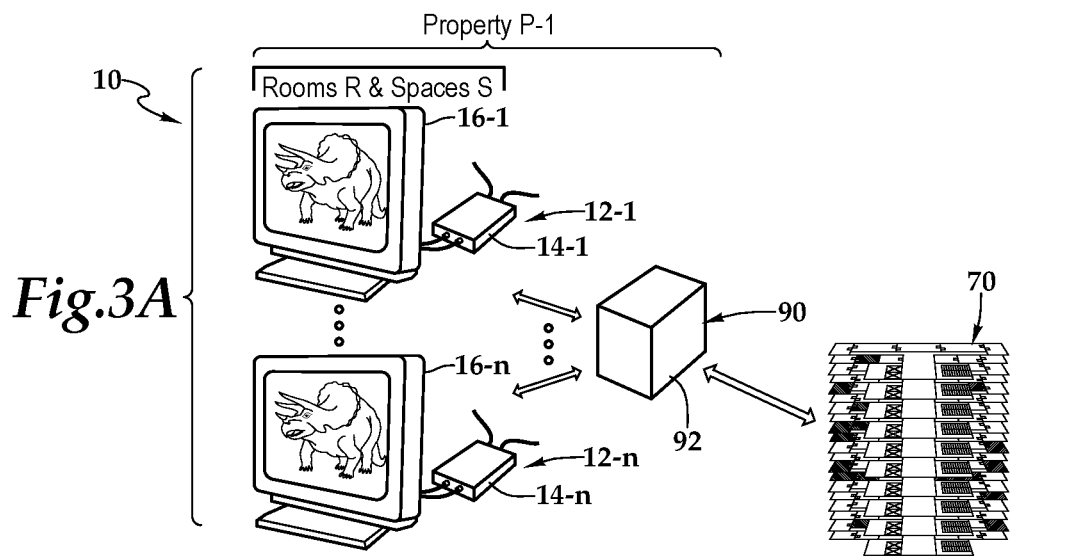
FIG. 3A is a schematic diagram depicting one embodiment of the system of FIG. 1 within an on-property deployment.
Figure 3B:
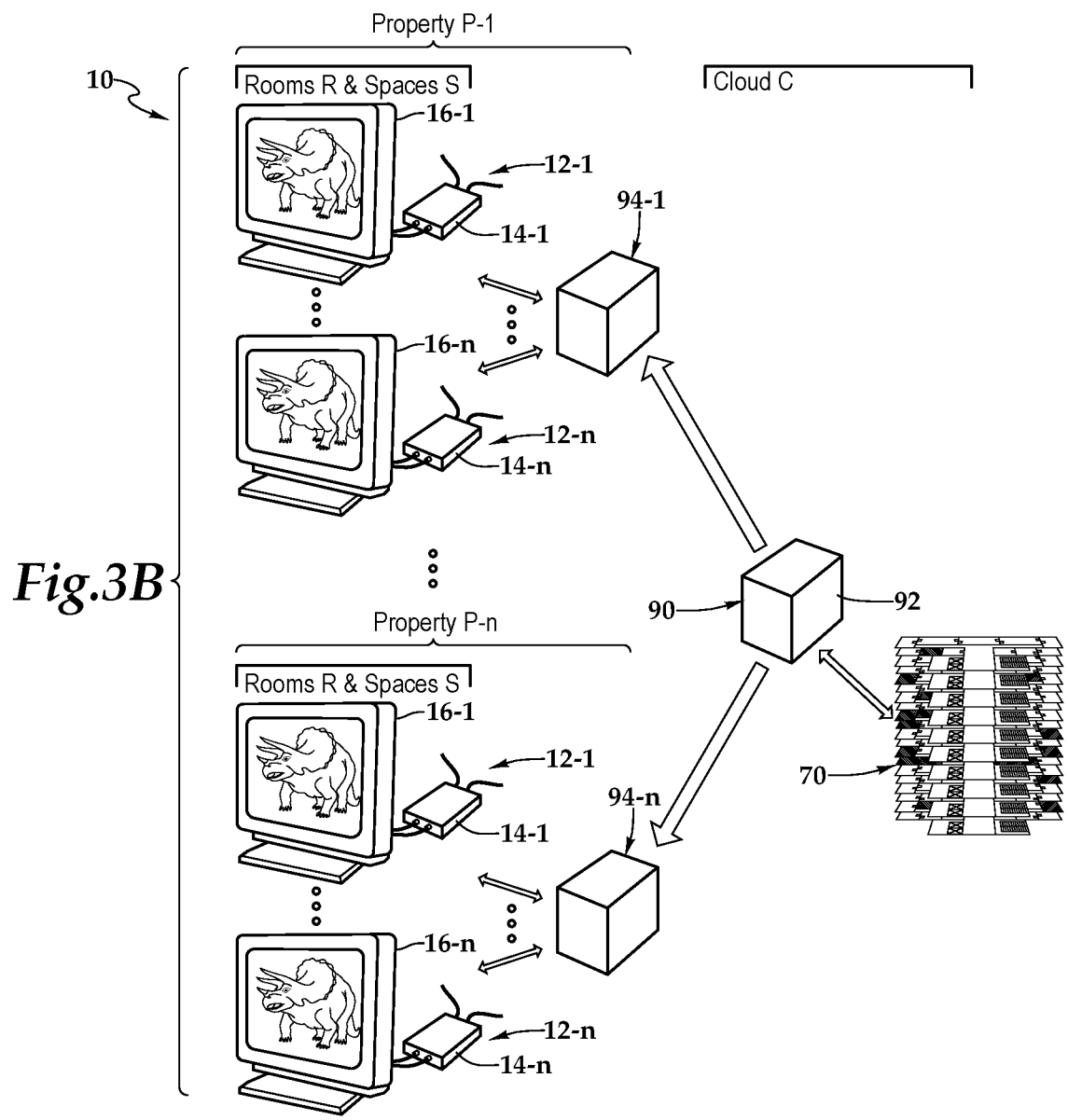
FIG. 3B is a schematic diagram depicting one embodiment of the system of FIG. 1 within a cloud-computing deployment.
Figure 4A:
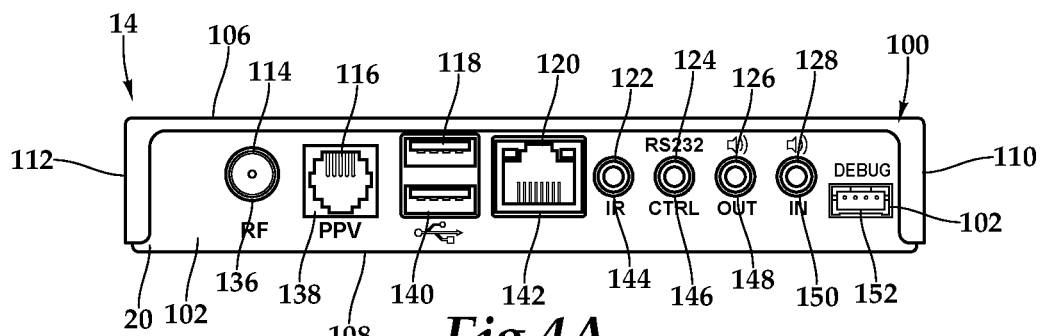
FIG. 4A is a wall-facing exterior elevation view of one embodiment of the set-top box depicted in FIG. 1 in further detail.
Figure 4B:
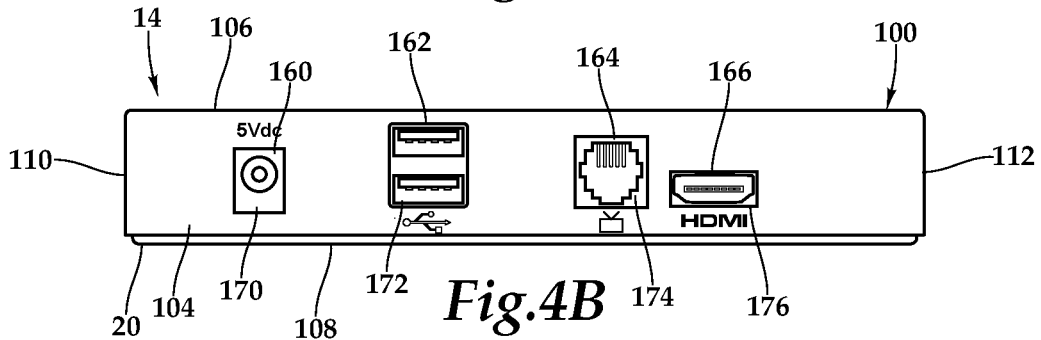
FIG. 4B is a television-facing exterior elevation view of the set-top box depicted in FIG. 1.
Figure 4C:
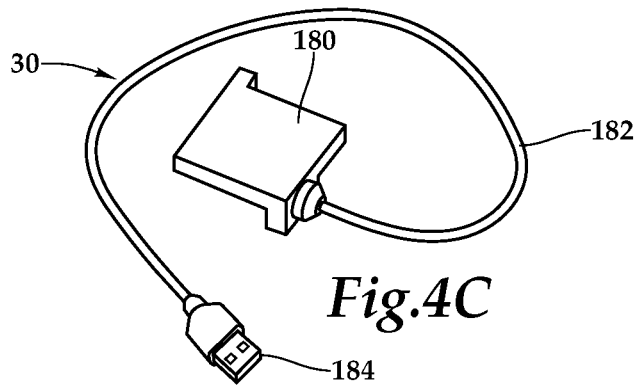
FIG. 4C is a front perspective view of a dongle depicted in FIG. 1 in further detail.
Figure 5:
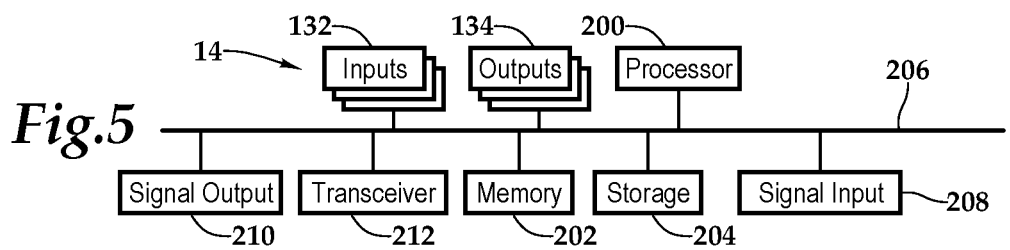
FIG. 5 is a functional block diagram depicting one embodiment of the set-top box presented in FIG. 4A and FIG. 4B.

Referring now to FIG. 3A and FIG. 3B, the server 90 may render a map view 70 of the hospitality establishment H based on obtained map data. Additionally, the server 90 may render the map view 70 of the hospitality establishment H with annotations based on the set-top box data 50 as discussed herein. In some embodiments, the map view 70 may include a graphical representation of one or more rooms of the hospitality establishment H that are annotated with set-top box data 50 relative to the physical data 52, the physical quality assurance data 54, the program data 56, the program quality assurance data 58, the interactive data 60, the environmental data 62, the identification data 64, and/or the self-diagnostic data 66. The server 90 may utilize the map view 70 to monitor and set environmental conditions across a single property or multiple properties by establishing the unoccupied room profile 74 and the occupied room profile 76 and propagating the unoccupied room profile 74 and the occupied room profile 76 to the set-top box 14. It should be appreciated that the server 90 may be located on a single property to serve one or more televisions thereon.

Further, it should be appreciated that the server 90 may be remotely located to serve multiple properties having multiple televisions.

Referring to FIG. 3A, the system 10 may be deployed such that the server 90, having the housing 92, is co-located with respect to the entertainment centers 12-1 . . . 12-n, which are located at property P-1. As shown, each of the entertainment centers 12-1 . . . 12-n may respectively include set-top boxes 14-1 . . . 14-n and displays 16-1 . . . 16-n. The server 90 may render a map view 70 of the hospitality establishment H that may be annotated with set-top box data 50 as discussed herein. Further, the server 90 may be utilized to monitor and set the environmental conditions across the properties P-1 . . . P-n. In this respect, the server 90 may propagate the unoccupied room profile 74 and occupied room profile 76 to the set-top boxes 14-1 . . . 14-n.

Referring to FIG. 3B, the system 10 may be deployed such that the server 90, having the housing 92, is located remotely within cloud C relative to the entertainment centers 12-1 . . . 12-n, which are located at properties P-1 through P-n. As shown, each of the entertainment centers 12-1 . . . 12-n may respectively include set-top boxes 14-1 . . . 14-n and displays 16-1 . . . 16-n. In particular, the server 90 may be located remotely relative to the entertainment centers 12-1 . . . 12-n such that a property headend 94-1 . . . 94-n is interposed between the server 90 and the entertainment centers 12-1 . . . 12-n. As shown, in this implementation, the property headend 94-1 . . . 94-n is co-located with the entertainment centers 12-1 . . . 12-n at a respective property, P-1 through P-n. The server 90 may render a map view 70 of the hospitality establishment H that may be annotated with set-top box data 50 as discussed herein. Further, the server 90 may be utilized to monitor and set the environmental conditions across the properties P-1 . . . P-n. In this respect, the server 90 may propagate the unoccupied room profile 74 and occupied room profile 76 to the set-top boxes 14-1 . . . 14-n across the properties P-1 . . . P-n.

Referring to FIG. 4A, FIG. 4B, FIG. 4C, and FIG. 5, as used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 14 includes a housing 20 including a panel 100 and a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The front wall 104 includes various ports, ports 114, 116, 118, 120, 122, 124, 126, 128, and 130 that provide interfaces for various interfaces, including inputs and outputs. In one implementation, as illustrated, the ports 114 through 130 include inputs 132 and outputs 134 and, more particularly, an RF input 136, a RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, and 166 include a 5V dc power connection 170, USB inputs/outputs 172, an RJ-45 coupling 174, and an HDMI port 176. It should be appreciated that the configuration of ports may vary with the set-top box depending on application and context. As previously alluded to, the housing 20 may include a housing-dongle combination including, with respect to the dongle 30, a unit 180 having a cable 182 with a set-top box connector 184 for selectively coupling with the set-top box 14.

Within the housing 20, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 20 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 14. Various inputs 132 and outputs 134 provide connections to and from the computing device, wherein the inputs 132 are the signals or data received by the set-top box 14, and the outputs 134 are the signals or data sent from the set-top box 14. A television content signal input 208 and a signal output 210 are also secured in the housing 20 in order to receive content from a source in the hospitality property and forward the content, including external content such as cable and satellite and pay-per-view (PPV) programing, to the television located within the hotel room.

A transceiver 212 is associated with the set-top box 14 and communicatively disposed with the bus 206. As shown the transceiver 212 may be internal, external, or a combination thereof to the housing. Further, the transceiver 212 may be a transmitter/receiver, receiver, or an antenna for example. Communication between various amenities in the hotel room and the set-top box 14 may be enabled by a variety of wireless methodologies employed by the transceiver 212, including 802.11, 3G, 4G, Edge, WiFi, ZigBee, near field communications (NFC), Bluetooth low energy and Bluetooth, for example. Also, infrared (IR) may be utilized. As previously discussed, the transceiver 212 is configured to be joined in network communication with an environmental amenity or amities that are co-located within the room of the respective set-top box 14.

In one embodiment, the storage 204 stores the unoccupied room profile 74, the occupied room profile 76, and the guest preference profile 72. The set-top box 14 may receive the unoccupied room profile 74, the occupied room profile 76, and the guest preference profile 72 by way of the transceiver 212 or any of the data connections discussed above, including the Ethernet category 5 (Cat 5) coupling 142. The memory 202 and storage 204 are accessible to the processor 200 and include processor-executable instructions that, when executed, cause the processor 200 to execute a series of operations. The processor-executable instructions cause the processor 200 to analyze the set-top box data 50 for defaults and store resultant self-diagnostic data. The processor-executable instructions also cause the processor 200 to store the set-top box data 50. The processor-executable instructions may also cause the processor 200 to send the set-top box data 50, or a portion thereof, and to send the self-diagnostic data either separately or with and as part of the set-top box data 50. The set-top box data 50 may be sent periodically or continuously or in response to a request from the server 90, for example.

In one implantation, the processor-executable instructions also cause the processor 200 to send environmental control information consistent with the unoccupied room profile 74 via the transceiver 212 to the environmental amenity when the room R is unoccupied. Unless the set-top box 14 is in receipt of an applicable guest preference profile, the processor-executable instructions cause the processor 200 to send environmental control information consistent with the occupied room profile 76 via the transceiver 212 to the environmental amenity when the room R is unoccupied. Upon receipt of the guest preference profile 72, the processor-executable instructions cause the processor 200 to send environmental control information consistent with the guest preference profile 72 via the transceiver 212 to the environmental amenity when the room R is unoccupied. When a housekeeping/maintenance profile 82 is applicable, the processor-executable instructions may cause the processor to temporarily override the unoccupied room profile 74, the occupied room profile 76 or the guest preference profile 72 with the housekeeping/maintenance profile 82.

Figure 6:
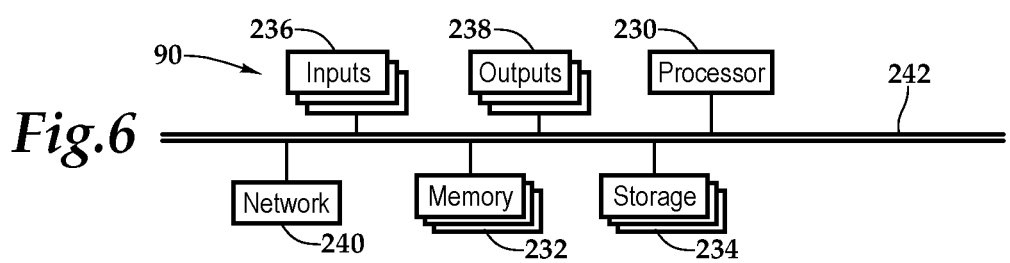
FIG. 6 is a functional block diagram depicting one embodiment of a server presented in FIG. 3A and FIG. 3B.

Referring now to FIG. 6, one embodiment of the server 90 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the server 90, including instructions stored in the memory 232 or in storage 234. The memory 232 stores information within the computing device. In one implementation, the memory 232 is a volatile memory unit or units. In another implementation, the memory 232 is a non-volatile memory unit or units. Storage 234 includes capacity that is capable of providing mass storage for the server 90. Various inputs 236 and outputs 238 provide connections to and from the server 90, wherein the inputs 236 are the signals or data received by the server 90, and the outputs 238 are the signals or data sent from the server 90. The network adaptor 240 couples the server 90 to a network such that the server 90 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. In one embodiment, the processor-executable instructions cause the processor to receive the set-top box data 50 from the set-top box 14 as well as receive the self-diagnostic data 66 from the set-top box 14. The processor-executable instructions may then cause the processor 230 to store the set-top box data 50 from the set-top box 14 in a database, which may be associated with the storage 234. The self-diagnostic data 66 from the set-top box 14 may also be caused to be stored in the database. The processor-executable instructions then cause the processor 230 to render a map view 70 of the hospitality establishment H based on obtained map data. As previously discussed, the map view 70 may include a graphical representation of the room R and a plurality of other rooms at the hospitality establishment H. The processor-executable instructions may then access the database and annotate the graphical representation of the room R with at least a portion of the set-top box data 50.

In some embodiments, the processor-executable instructions cause the processor 230 to render a map view 70 of the hospitality establishment H based on obtained map data and the map view 70 may include a graphical representation of the room and other rooms at the hospitality establishment H. The processor-executable instructions, when executed, may cause the processor 230 to render a 3-D perspective view of the hospitality establishment H, a multi-floor view of the hospitality establishment H, a 2-D top plan view of at least a portion the hospitality establishment H, or a map view 70 of a floor of the hospitality establishment H, for example. The map view 70 may be a virtual model of at least a portion of the physical body of the hospitality establishment H, including a virtual model of the physical body of the hospitality establishment H.

In some embodiments, the processor-executable instructions cause the processor 230 to at least partially integrate or at least partially combine multiple portions of the set-top box data 50 into the graphical representation of the room R. The processor-executable instructions may also include instructions that cause the processor 230 to implement a map application configured to provide a user interface and obtain instructions from a user on the desired map view 70 and annotations.

In some embodiments, the processor-executable instructions cause the processor 230 to select the environmental condition or conditions to control. The processor-executable instructions may also set the environmental condition or conditions. Following the environmental conditions being set, the processor-executable instructions to propagate the unoccupied room profile 74 and the occupied room profile 76 consistent with the set environmental condition.

Figure 7:
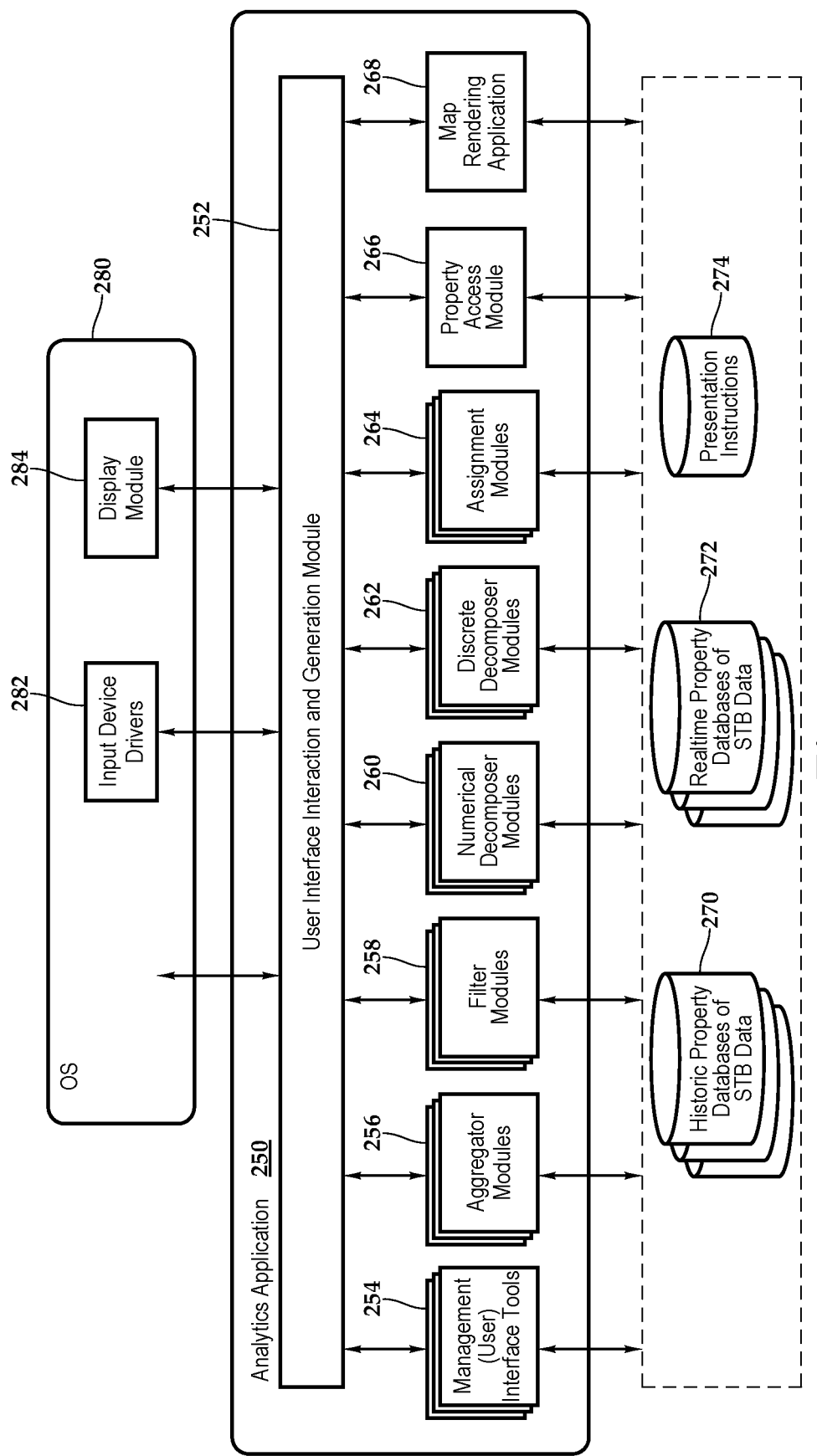
FIG. 7 is a conceptual module diagram depicting a software architecture of an analytics application of some embodiments.

FIG. 7 conceptually illustrates the software architecture of an analytics application 250 of some embodiments that may render the map view 70 of the hospitality establishment H. In some embodiments, the analytics application 250 is a stand-alone application or is integrated into another application, while in other embodiments the application might be implemented within an operating system 280. Furthermore, in some embodiments, the analytics application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The analytics application 250 includes a user interface (UI) interaction and generation module 252, management (user) interface tools 254, aggregator modules 256, filter modules 258, numerical decomposer modules 260, discrete decomposer modules 262, assignment modules 264, property access module 266, and a map rendering application 268. The analytics application 250 has access to historic property databases of set-top box data 270, real-time property databases of set-top box data 272, and presentation instructions 274, which presents instructions from the operation of the analytics operation 250. In some embodiments, storages 270, 272, and 274 are all stored in one physical storage. In other embodiments, the storages 270, 272, 274 are in separate physical storages, or one of the storages is in one physical storage while the other is in a different physical storage.

The UI interaction and generation module 252 generates a user interface that allows the end user to specify parameters that may be utilized to generate an annotated map view of the hospitality establishment H, which may include elements of a heat map. Prior to the generation of an annotated map view of the hospitality establishment H, the aggregator modules 256 may be executed to obtain instances of set-top box data 50. In other instances, the set-top box data 50 is continually provided to the analytics application 250 such that the aggregator modules 256 do not have to obtain instances of set-top box data 50 proactively. The set-top box data 50 may also be filtered by the filter modules 258. The aggregator modules 256 and the filter modules 258 cooperate, in combination, to gather the desired set-top box data.

At this time, the parameters have been established for the annotated map view of the hospitality establishment H by default or by an end user utilizing the management (user) interface tools 254. The numerical decomposer modules 260 may be executed to numerically decompose instances or summaries of set-top box data 50 gathered by the aggregator modules 256 and the filter modules 258 by applying the selected performance characteristic or selected performance characteristics to the instances of the set-top box data 50. The discrete decomposer modules 262 may be executed to containerize the decomposed set-top box data 50. In this manner, multiple containers may be defined that each have a range of values. The assignment modules 264 may be executed to assign a pre-map annotation element to each of the multiple containers. The property access module 266 may be executed to obtain data from the historic property databases of set-top box data 270 or the real-time property databases of set-top box data 272. The map rendering application 268 may be executed to call a map rendering application 300 of FIG. 7, for example.

In the illustrated embodiment, FIG. 7 also includes an operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope or accelerometer, for example. A user interacts with one or more of these input devices, which send signals to their corresponding device driver. The device driver then translates the signals into user input data that is provided to the UI interaction and generation module 252.

Figure 8:
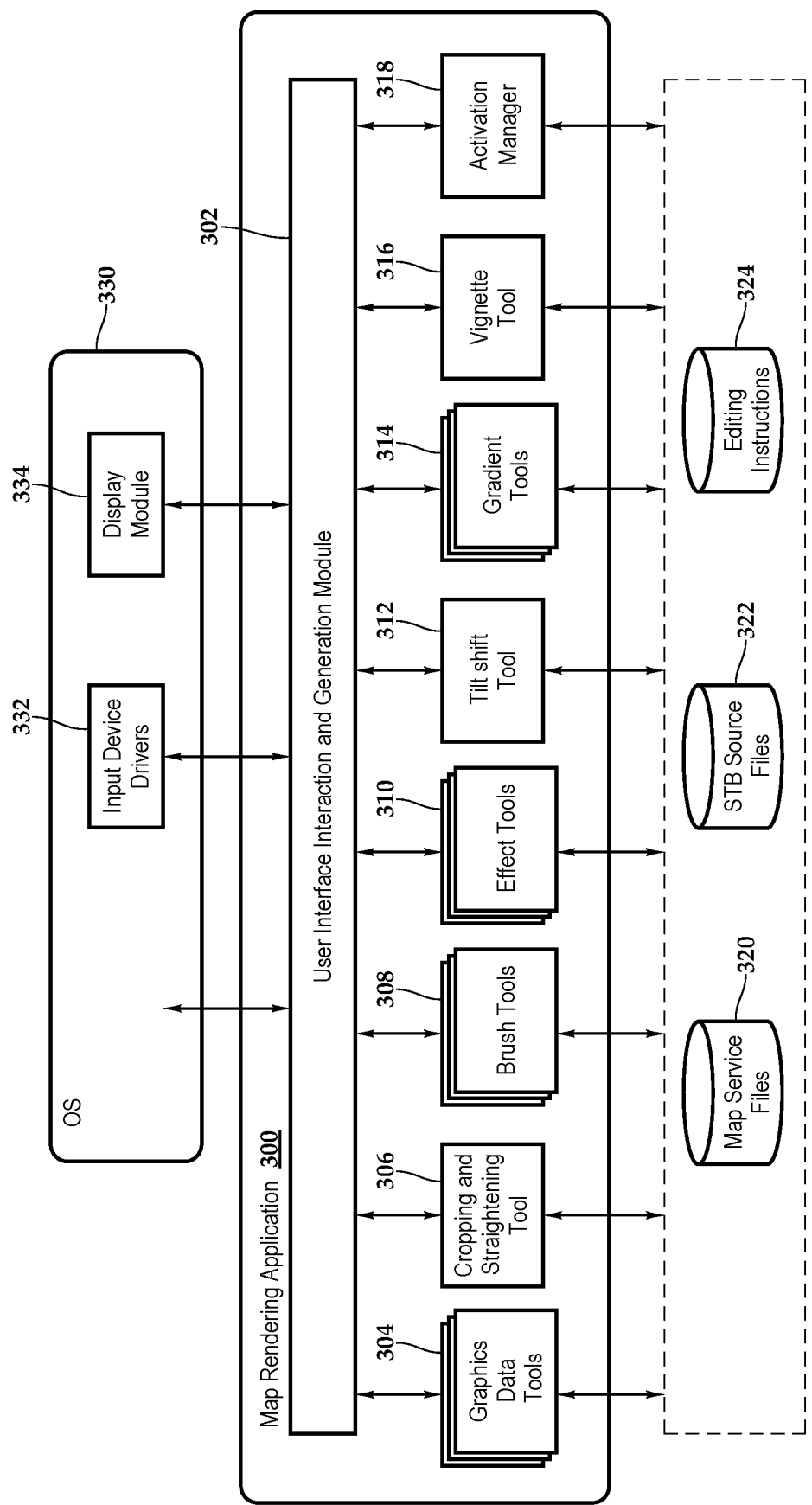
FIG. 8 is a conceptual module diagram depicting a software architecture of an image viewing, editing, and organization application of some embodiments.

FIG. 8 conceptually illustrates the software architecture of a map rendering application 300 of some embodiments that may render the map view 70 of the hospitality establishment H. In some embodiments, the map rendering application 300 is a stand-alone application or is integrated into another application, while in other embodiments the application might be implemented within an operating system. Furthermore, in some embodiments, the map rendering application 300 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The map rendering application 300 includes a UI interaction and generation module 302, graphics data tools 304, a cropping and straightening tool 306, brush tools 308, effect tools 310, a tilt shift tool 312, gradient tools 314, a vignette tool 316, and an activation manager 318. The image editing application has access to map service files 320, set-top box source files 322, and editing instructions 324. In some embodiments, the map service files 320 may be vector graphics data files with texture identifiers or two or three dimensional map image files specified in one or more map tiles that may be raster-based map tiles, for example. The map service files 320 create a virtual model of the physical body of the hospitality establishment H based on definitions derived from any GIS resources, such as a geodatabase, address location map document or geoprocess model, or any two- or three-dimensional CAD-based drawings and plans.

The set-top box source files 322 store operational instructions for processing set-top box data 50. The editing instructions 324 store the image editing operations that the map rendering application 300 performs as a set of instructions. The map rendering application 300 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 320 and set-top box source files 322. In some embodiments, storages 320, 322, and 324 are all stored in one physical storage. In other embodiments, the storages 320, 322, 324 are in separate physical storages, or one of the storages is in one physical storage while the other is in a different physical storage.

In the illustrated embodiment, FIG. 8 also includes an operating system 330 that includes input device driver(s) 332 and a display module 334. In some embodiments, as illustrated, the device drivers 332 and display module 334 are part of the operating system 330 even when the image editing application is an application separate from the operating system. The input device drivers 332 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction and generation module 300.

The present application describes a graphical user interface that provides users with numerous ways to perform different sets of operations and functionalities. By either executing a pre-determined series of editing instructions on a pre-determined set of media source files or receiving a selection of media processing operations, the present map rendering application 300 provides for a map view of the hospitality establishment with the appropriate annotations of set-top box data.

Figure 9:
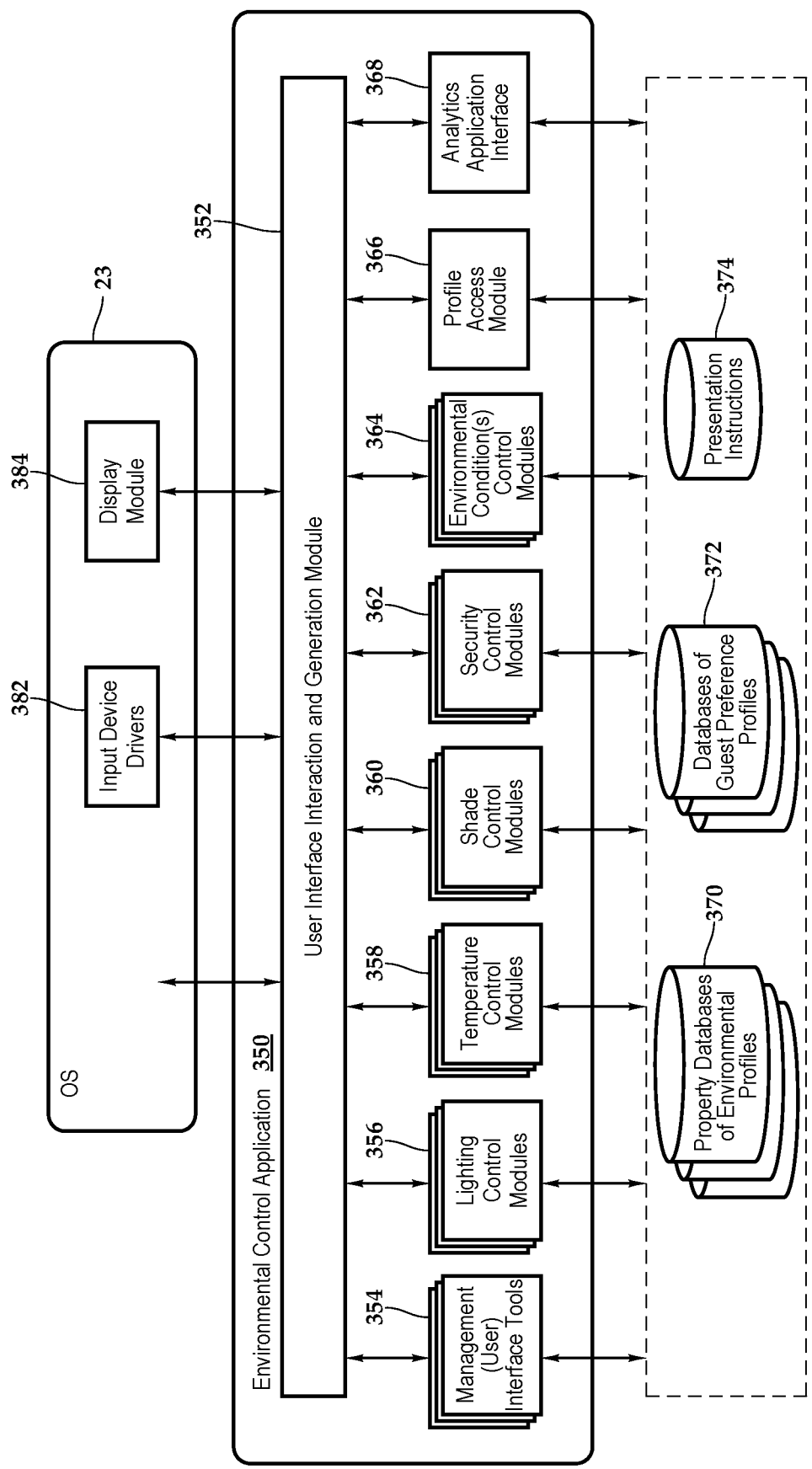
FIG. 9 is a conceptual module diagram depicting a software architecture of an environmental control application of some embodiments.

FIG. 9 conceptually illustrates the software architecture of an environmental control application 350 of some embodiments that may utilized the map view 70 or other application to set the environmental profiles and therefore environmental conditions with the hospitality establishment H and across hospitality properties. In some embodiments, the environmental control application 350 is a stand-alone application or is integrated into another application, while in other embodiments the application might be implemented within an operating system 380. Furthermore, in some embodiments, the environmental control application 350 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The environmental control application 350 includes a UI interaction and generation module 352, management (user) interface tools 354, lighting control modules 356, temperature control modules 358, shade control modules 360, security control modules 362, environmental conditions(s) control modules 364, profile access module 366, and analytics application interface 368. The profile access module 366 has access to property databases of environmental profiles 370, databases of guest preference profiles 372, and presentation instructions 374. In some embodiments, the property databases of environmental profiles store unoccupied room profiles 74 and associated data as well as occupied room profiles 76 and associated data. The databases of guest preference profiles store guest preference profiles and associated data.

The management (user) interface tools 354 store operational instructions for monitoring and setting environmental conditions via the analytics application 250 and the associated map rendering application 300 by way of the analytics application interface 368. The environmental control application 350 uses the lighting control modules 356, the temperature control modules 358, the shade control modules 360, the security control modules 362 and the environmental condition(s) control modules 362 to various control variables to generate, establish, and monitor the environmental profiles, including the unoccupied room profiles 74, the occupied room profiles 76, and guest preference profiles 72.

In the illustrated embodiment, FIG. 9 also includes an operating system 380 that includes input device driver(s) 382 and a display module 384. In some embodiments, as illustrated, the device drivers 382 and display module 384 are part of the operating system 380 even when the image editing application is an application separate from the operating system. The input device drivers 382 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction and generation module 352.

The present application describes a graphical user interface that provides users with numerous ways to perform different sets of operations and functionalities. By either executing a pre-determined series of editing instructions on a pre-determined set of media source files or receiving a selection of media processing operations, the present environmental control application 350 provides for a map view 70 of the hospitality establishment H with the appropriate annotations of set-top box data 50 to monitor environmental conditions and set the environmental conditions in one hospitality property or across multiple hospitality properties prior to propagating unoccupied room profiles 74 and occupied room profiles 76.

Figure 10A:
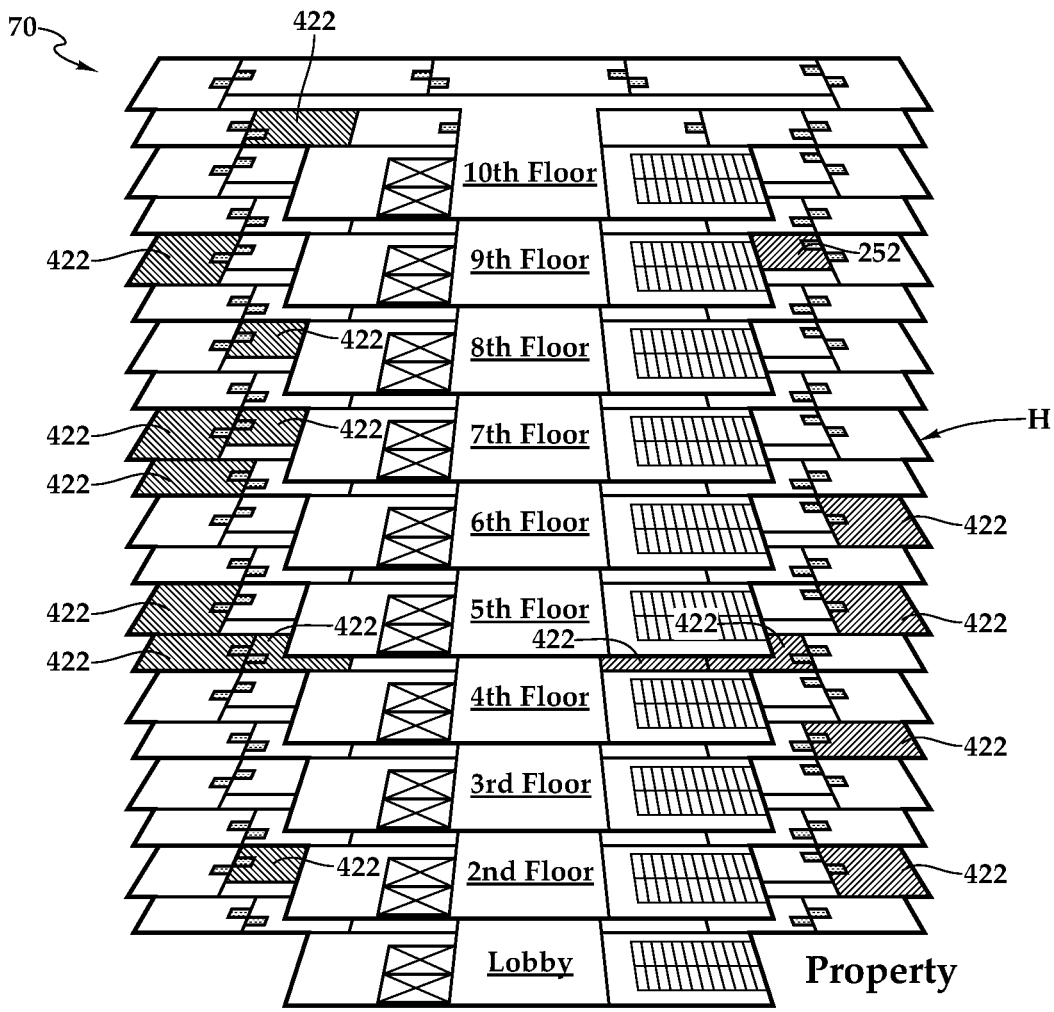
FIG. 10A is a schematic diagram depicting one embodiment of a map representation of a hospitality lodging establishment utilizing one embodiment of a hospitality property management tool presented herein.
Figure 10B:
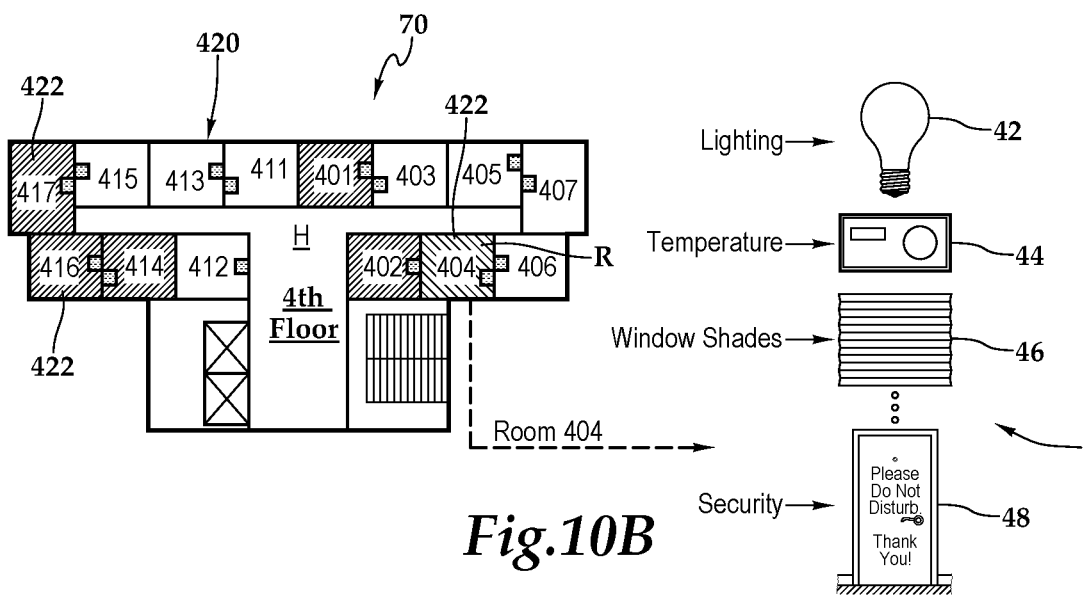
FIG. 10B is a schematic diagram depicting one embodiment of a map representation of a floor of the hospitality lodging establishment presented in FIG. 10A.

Referring now to FIG. 10A and FIG. 10B, in one implementation, property monitoring and optimization is provided in the form of a database, or as shown, in the map view 70 of the hospitality establishment H including a graphical presentation 420 of a floor of the hospitality establishment H, wherein particular hotel rooms with set-top box data 50 historically and in substantially real time permits a user or manager to select the desired information and make optimal property management decisions, including establishing and setting environmental controls over one or more properties. In particular, color-coding and hue assignment adds additional understanding and visibility into housekeeping and maintenance conditions as well as use. By way of example and not by way of limitation, the hospitality establishment is graphical depicted as having a lobby and ten floors, which are lobby, $2^{nd}$ floor, 3rd floor, etc. For each floor, such as the $4^{th}$ floor, a floor layout is shown with rooms, such as rooms 401 through 407 and 411 through 417. In FIGS. 10A and 10B, by collecting the substantially real time and historic set-top box data 50 from the field, a map may be shown depicting all rooms that are occupied. In particular, room 404 from FIG. 1 is highlighted to inspect the occupation status and occupied room profile, with various amenities 40, which are depicted as the lighting 42, the thermostat 44 representing temperature control, the window shades 46, and the security 48, which is depicted as a door indication for "Please Do Not Disturb.". With this information and knowledge of the issue, management may appropriately administer the strategy for organizing and coordinating the resources of the property, including the environmental conditions. As mentioned, it should be appreciated that other types of databases and charts may be prepared from the substantially real-time information collected.

As shown, by way of example, the status of Room 404 is being examined as the environmental conditions across each highlighted room 422 and the hotel H are being monitored and studied to establish the unoccupied room profile and the occupied room profile. Management uses the map view 70 to gather real time information about the status of the rooms and properties and reports on the environmental conditions. To view the set-top box data 50 captured from each set-top box 14 in each room, the map view users can select a room from the map and appropriately click or tap on the rooms and then select the set-top box data 50 or other processing operations requested.

The system 10 presented herein provides for the management of hospitality real estate and to the operation, control, and oversight of hospitality properties, such as lodging establishments, motels, or hotels, for example. In one embodiment, a web-hosted, cloud-based property monitoring and troubleshooting tool is furnished that provides a graphical presentation of the hospitality properties with historic and real time room and equipment status. By way of example and not by way of limitation, the user may select to annotate the map view with rooms and equipment online/offline, rooms and equipment percentage online status, groups by percentage, rooms and equipment that are powered off, rooms and equipment TV control status and TV types by model number, rooms and equipment with TV output errors or rooms and equipment with HDCP errors. Also, possible instructions include to show rooms and equipment by firmware version numbers, show rooms and equipment by UI software version numbers, show rooms and equipment by settings version numbers, show rooms that are tuned to the welcome channel, show rooms that are tuned to a TV channel and group them by channels, show rooms with program guide trouble, show room set top box memory usage, show room self-test results, show rooms with self-test failures, force self-test, view the self-test result, view rooms with failure, force software update, force UI software update, force configuration change or force power state change. The user may utilize the annotated map view to effect commands to one or more rooms including online/offline, network address, MAC address, hardware configuration and identifiers, software configuration and versions, TV connection status, control interface and HDMI interface or unit up-time and health reports, for example. The user may also utilize the system for full access to debug console ports on each set-top box. As mentioned, historic set-top box data 50 may be viewed by property or properties, room or room, with user selectable constraints such as data and time. Further, the system 10 may be utilized to monitor the installation process. Further still, the system 10 may be utilized to monitor and establish environmental conditions across a property and multiple properties.

Figure 11:
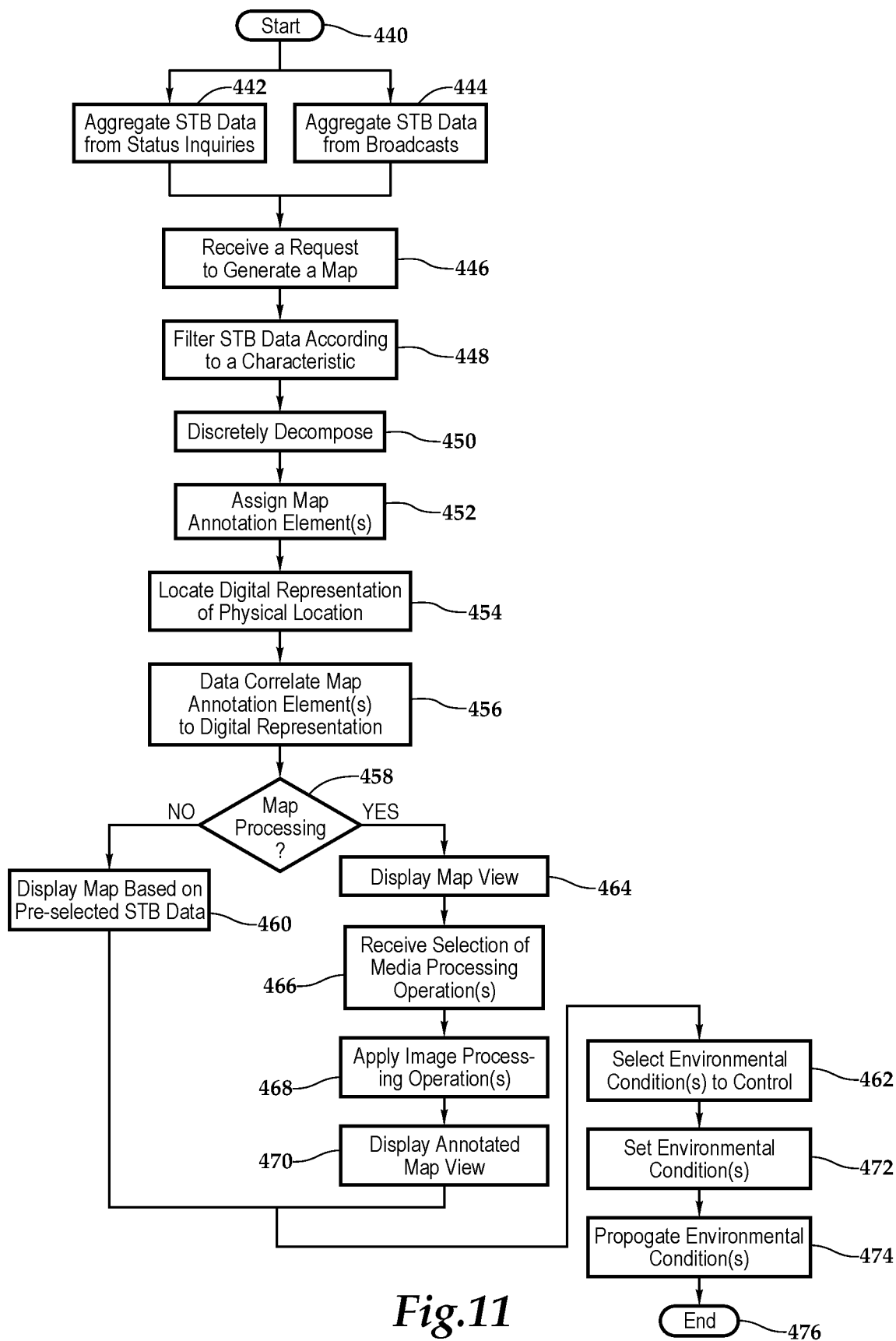
FIG. 11 is a flow chart depicting one embodiment of a method for providing hospitality property management according to the teachings presented herein.

Referring now to FIG. 11, one embodiment of a method for utilizing property management tools for the operation, control, and oversight of hospitality properties, such as lodging establishments, motels, or hotels, for example, is depicted. The methodology starts at block 440 and progresses through blocks 442 and 444 where, respectively set-top box data 50 is aggregated from status inquiries from the server to the set-top boxes and aggregated from set-top boxes broadcasting the set-top box data 50. At block 446, the server receives a request to generate a map view 70 of a particular hospitality property. At block 448, the server filters the aggregated set-top box data 50 according to a characteristic or characteristics. At blocks 450 and 454, the set-top box data 50 is discretely decomposed and assigned annotation elements. At block 456, the digital representation of the physical location, e.g., the hospitality property, is located and at block 456, the data correlation of the map annotation elements to the digital representation occurs.

At decision block 458, if the map processing including any applied annotations are based on a pre-selected or pre-stored or pre-defined criteria, then the methodology advances to block 460 where the appropriate map view 70 is rendered prior to block 470, the methodology continues. On the other hand, at decision block 458, if user input will be sought on the map view and annotations, then the methodology displays the map view at block 464. Then at block 466, the server receives selection of media processing operations from the user and then applies the image processing operations at block 468. The media processing operations may include, for example, selecting the media to be displayed and various luminance and color properties and such to provide further visibility into the map view. At block 470, the map view with annotations is rendered prior to the methodology continues at block 462. At block 462, the environmental conditions to control are selected and then set at block 472. At block 474, the environmental conditions are propagated throughout the hospitality property or hospitality properties by establishing the unoccupied room profile and occupied room profile prior to the methodology ending at block 476.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for property management of a property, the method comprising:
 establishing communication with a plurality of room controllers distributed in a respective plurality of rooms at the property, each room controller comprising a processor, non-transitory memory, storage, a signal input, a signal output, and a transceiver interconnected in a busing architecture;
 storing in the storage of each room controller at least two profiles selected from the group consisting of an unoccupied room profile, an occupied room profile, a guest preference profile, and a housekeeping/maintenance profile;
 joining the transceiver of each room controller in network communication with an environmental amenity located within the respective room, the environmental amenity configured to control environmental conditions within the room;
 providing environmental conditions in each of the plurality of rooms based on the stored profiles, wherein:
  the unoccupied room profile defines environmental conditions when the room is unoccupied,
  the occupied room profile defines environmental conditions when the room is occupied, and
  the guest preference profile defines environmental conditions in a particular room when occupied by a specific guest; and
 executing processor instructions in the non-transitory memory of each room controller to:
  when the room is unoccupied, transmit environmental control information consistent with the unoccupied room profile via the transceiver to the environmental amenity, and
  when the room is occupied, transmit environmental control information via the transceiver to the environmental amenity consistent with one of the occupied room profile and the guest preference profile.

2. The method as recited in claim 1, further comprising storing the profiles in the storage of each room controller.

3. The method as recited in claim 1, wherein the environmental conditions include at least one condition selected from the group consisting of lighting, temperature, shade, security locks, power outlets, and housekeeping/maintenance conditions.

4. The method as recited in claim 1, wherein the guest preference profile comprises an individual sub-profile, a group sub-profile, and selection rules determining the application of the individual sub-profile and the group sub-profile.

5. The method as recited in claim 1, further comprising:
 providing a housekeeping/maintenance profile stored in the storage of each room controller; and
 executing processor instructions to temporarily override one of the unoccupied room profile, occupied room profile, and guest preference profile with the housekeeping/maintenance profile.

6. The method as recited in claim 1, wherein the guest preference profile is activated by the guest in the room corresponding to the guest preference profile.

7. The method as recited in claim 1, wherein the guest preference profile is activated upon guest check-in for the room corresponding to the guest preference profile.

8. The method as recited in claim 1, wherein each room controller comprises a data connection interconnected in the busing architecture.

9. The method as recited in claim 8, wherein the profiles are received via the data connection.

10. The method as recited in claim 1, wherein the transceiver communicates with the environmental amenity via a standard selected from the group consisting of infrared (IR), 802.11, 3G, 4G, Edge, Wi-Fi, ZigBee, near field communications (NFC), Bluetooth, and Bluetooth low energy.

11. The method as recited in claim 1, wherein the plurality of room controllers are located in a hospitality establishment selected from the group consisting of furnished multi-family residences, dormitories, lodging establishments, hotels, hospitals, and multi-unit environments.

12. The method as recited in claim 1, wherein the environmental control information includes at least one status selected from the group consisting of amenity interaction, lighting status, thermostat status, window shades status, and door status.

13. The method as recited in claim 1, wherein the signal output of each room controller is connected to a display selected from the group consisting of televisions and electronic visual display devices.

14. The method as recited in claim 1, wherein the environmental amenity is configured to communicate with the environmental control information via the transceiver, the transceiver operating on a standard selected from the group consisting of infrared (IR), 802.11, 3G, 4G, Edge, Wi-Fi, ZigBee, near field communications (NFC), Bluetooth, and Bluetooth low energy.

15. The method as recited in claim 1, wherein the plurality of room controllers are strategically located in a hospitality establishment selected from the group consisting of furnished multi-family residences, dormitories, lodging establishments, hotels, hospitals, and multi-unit environments.

16. The method as recited in claim 1, wherein the environmental control information includes data related to amenity interaction, lighting status, thermostat status, window shades status, and door status.

17. The method as recited in claim 1, wherein the signal output of each room controller is connected to a display selected from the group consisting of televisions and electronic visual display devices.

18. A method for property management of a property, the method comprising:
    establishing communication with a plurality of room controllers distributed in a respective plurality of rooms at the property, each room controller comprising a processor, non-transitory memory, storage, a signal input, a signal output, and a transceiver interconnected in a busing architecture;
    storing in the storage of each room controller at least two profiles selected from the group consisting of an unoccupied room profile, an occupied room profile, a guest preference profile, and a housekeeping/maintenance profile;
    joining the transceiver of each room controller in network communication with an environmental amenity located within the respective room, the environmental amenity configured to control environmental conditions within the room;
    providing environmental conditions in each of the plurality of rooms based on the stored profiles, wherein:
        the unoccupied room profile defines environmental conditions when the room is unoccupied,
        the occupied room profile defines environmental conditions when the room is occupied, and
        the housekeeping/maintenance profile defines environmental conditions; and
    executing processor instructions in the non-transitory memory of each room controller to:
        when the room is unoccupied, transmit environmental control information consistent with the unoccupied room profile via the transceiver to the environmental amenity,
        when the room is occupied, transmit environmental control information consistent with the occupied room profile via the transceiver to the environmental amenity, and
        temporarily override one of the unoccupied room profile and occupied room profile with the housekeeping/maintenance profile.

19. The method as recited in claim 18, wherein the plurality of room controllers are strategically located in a hospitality establishment selected from the group consisting of furnished multi-family residences, dormitories, lodging establishments, hotels, hospitals, and multi-unit environments.

20. A method for property management of a property, the method comprising:
    establishing communication with a plurality of room controllers distributed in a respective plurality of rooms at the property, each room controller comprising a processor, non-transitory memory, storage, a signal input, a signal output, and a transceiver interconnected in a busing architecture;
    storing in the storage of each room controller at least two profiles selected from the group consisting of an unoccupied room profile, an occupied room profile, and a housekeeping/maintenance profile;
    joining the transceiver of each room controller in network communication with an environmental amenity located within the respective room, the environmental amenity configured to control environmental conditions within the room;
    providing environmental conditions in each of the plurality of rooms based on the stored profiles, wherein:
        the unoccupied room profile defines environmental conditions when the room is unoccupied,
        the occupied room profile defines environmental conditions when the room is occupied, and
        the housekeeping/maintenance profile defines environmental conditions; and
    executing processor instructions in the non-transitory memory of each room controller to:
        when the room is unoccupied, transmit environmental control information consistent with the unoccupied room profile via the transceiver to the environmental amenity,
        when the room is occupied, transmit environmental control information consistent with the occupied room profile via the transceiver to the environmental amenity, and
        temporarily override one of the unoccupied room profile and occupied room profile with the housekeeping/maintenance profile.

* * * * *